Aug. 24, 1965    P. J. COLMERAUER    3,202,413
FLUID-PRESSURE DEVICES FOR VEHICLE
SUSPENSIONS OR THE LIKE
Filed April 11, 1963    3 Sheets-Sheet 1

INVENTOR.
Paul Jacques Colmerauer
Michael S. Striker

Aug. 24, 1965  P. J. COLMERAUER  3,202,413
FLUID-PRESSURE DEVICES FOR VEHICLE
SUSPENSIONS OR THE LIKE
Filed April 11, 1963  3 Sheets-Sheet 2

INVENTOR.
Paul Jacques Colmerauer
BY
Michael J. Striker

Aug. 24, 1965      P. J. COLMERAUER      3,202,413
FLUID-PRESSURE DEVICES FOR VEHICLE
SUSPENSIONS OR THE LIKE
Filed April 11, 1963      3 Sheets-Sheet 3
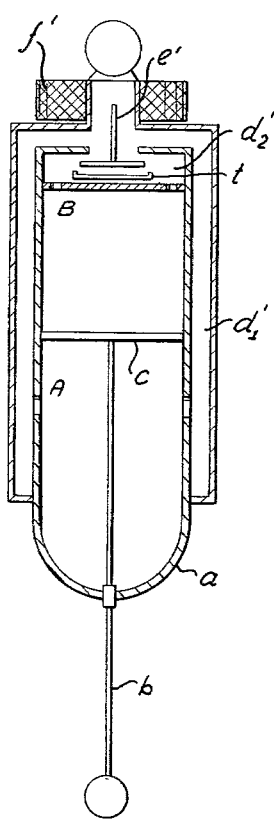
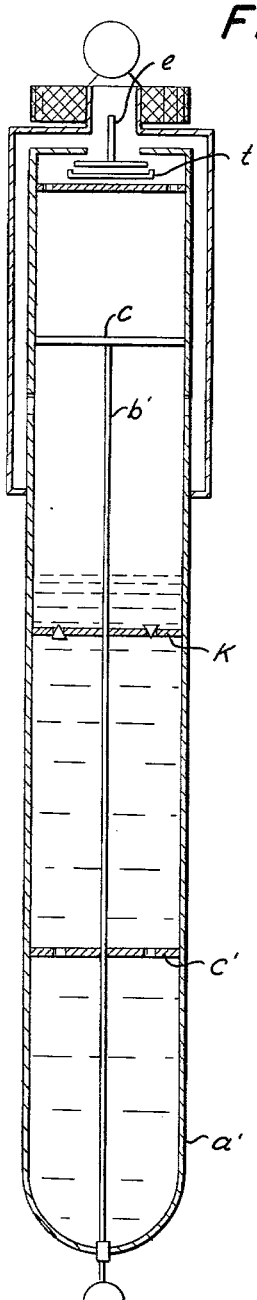
INVENTOR.
Paul Jacques Colmerauer
BY
Michael J. Striker United States Patent Office 3,202,413
Patented Aug. 24, 1965

3,202,413
FLUID-PRESSURE DEVICES FOR VEHICLE
SUSPENSIONS OR THE LIKE
Paul Jacques Colmerauer, Paris, France, assignor to
Hoesch A.G., Dortmund, Germany
Filed Apr. 11, 1963, Ser. No. 272,392
Claims priority, application France, Apr. 13, 1962,
894,345
8 Claims. (Cl. 267—34)

The present invention relates to fluid-pressure devices.

In particular, the present invention relates to fluid-pressure devices such as pneumatic devices adapted to be used in vehicle suspensions.

As is well known, conventional vehicle suspensions are designed to operate in a particular way which can be demonstrated by a certain characteristic curve which shows the manner in which a particular vehicle suspension, for example, will operate. While such devices will give satisfactory operation under certain conditions, they will not, of course, give the best type of operation for all types of loads and under all types of conditions.

It is accordingly a primary object of the present invention to provide a fluid-pressure device which is capable of being used in a vehicle suspension or the like and which can be operated in such a way that its reaction to different loads and different operating conditions can be adjusted so as to provide for much better types of operation under many different types of conditions and widely varying loads.

It is furthermore an object of the present invention to provide a fluid-pressure device of the above type which is exceedingly simple in its construction and which can be very precisely controlled in an exceedingly simple way.

It is furthermore an object of the present invention to provide a fluid-pressure device of the above type which can be conveniently combined with other elements such as suspension springs to provide an improvement in conventional suspensions.

It is also an object of the present invention to provide a fluid-pressure device of the above type which can conveniently be combined with an element such as a hydraulic shock absorber.

With these objects in view the invention includes, in a fluid-pressure device which is adapted to be used in a vehicle suspension or the like, a cylinder containing a compressible fluid, and a piston slidable along the interior of the cylinder. A piston rod is fixed to the piston and extends therefrom fluid-tightly and slidably through one end of the cylinder. In accordance with the present invention there is provided a resistance-increasing means which communicates with the interior of the cylinder for substantially increasing the resistance to axial movement of the piston in at least one direction in the cylinder at any location of the piston along a given portion of the cylinder.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 is a graph illustrating the curve of operation of the device of FIG. 3 when the valve thereof has the position shown in FIG. 3a;

FIG. 9 shows a variation of the structure of the present invention; and

FIG. 10 shows how the structure of FIG. 9 can be modified so as to be combined with a hydraulic shock absorber.

Figure 1:
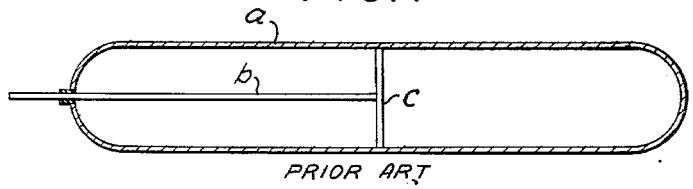
FIG. 1 illustrates a conventional pneumatic device.

Referring to FIG. 1, there is shown therein a simple cylinder $a$ which is completely closed. A piston rod $b$ extends slidably and fluid-tightly through one end of the cylinder $a$, the cylinder $a$ carrying a suitable sealing gland through which the piston rod $b$ slidably extends in a fluid-tight manner. Within the cylinder $a$ is also located a piston $c$ which is fixed to the piston rod $b$, so that the position of the cylinder $a$ and piston $c$ one with respect to the other will change according to forces exerted on the rod $b$ or cylinder $a$. The cylinder $a$ is filled with a compressible fluid such as, for example, air. The piston $c$ is shown in its position of equilibrium in FIG. 1, this particular position of equilibrum being that which is assumed by the piston $c$ in the cylinder $a$ when there is no force acting on the rod $b$. At this time, the fluid within the cylinder $a$ acts with equal forces on the opposed faces of the piston $c$.

Figure 2:
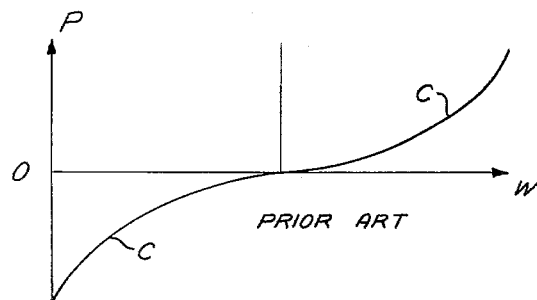
FIG. 2 shows the curve which is characteristic of the operation of the conventional pneumatic device of FIG. 1.

If a force P is applied to the piston rod $b$ so as to displace the piston through a certain distance W until the force resisting movement of the piston in the cylinder equals the force P, then an operation as illustrated in FIG. 2 will be produced. As may be seen from FIG. 2 the force P forms the ordinate and the distance of displacement of the piston forms the abscissa W, and it will be seen that when the force P acts to displace piston $c$ to the right from the position thereof shown in FIG. 1 then a curve C extending to the right upwardly from the abscissa OW will result while when the force acts in the opposite direction the curve C extending downwardly from the abscissa of FIG. 2 will result. Thus, it will be seen that the characteristic curve of operation of the conventional device of FIG. 1 has a pair of oppositely directed curved portions depending upon the direction in which the force acts on the piston. These oppositely directed curves of course join each other at the equilibrium position of the piston when there is no load on the rod $b$.

In accordance with the present invention it becomes possible to modify the characteristic curve C of FIG. 2, as will be apparent from the description below. Thus, referring to FIG. 3, it will be seen that, in accordance with the present invention, the cylinder $a$ has been modified by being provided with a pair of outlets or outlet means at the locations A and B which are axially spaced with respect to each other along the cylinder $a$, and these outlets or outlet means include the ducts $d_1$ and $d_2$. In the particular example illustrated in FIG. 3 the pair of ducts $d_1$ and $d_2$ communicate with a common chamber $h$, so that the combination of hte ducts and chamber $h$ form a passage means located at the exterior of the cylinder and communicating therewith at the pair of locations A and B. It is believed to be apparent that as long as this passage means remains open and the piston $c$ is located between the locations A and B, then the fluid in the cylinder $a$ will flow out of and back into the same in one direction or the other through the passage means depending upon the direction of movement of the piston $c$ between the locations A and B.

Figure 3A:
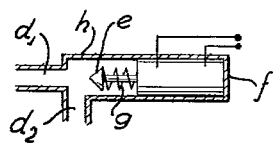
FIG. 3a shows the valve structure of FIG. 3 in a position different from that of FIG. 3.
Figure 3:
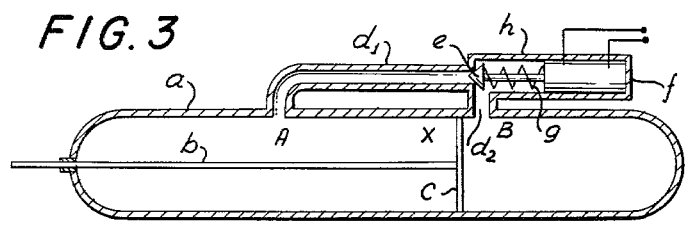
FIG. 3 is a schematic illustration of one possible structure of a pneumatic device according to the invention.

The structure of the invention also includes a non-return valve means $e$ which is urged, in the example of FIG. 3, by a relatively weak spring $g$ to the closed position shown in FIG. 3, so that the non-return valve means $e$ of FIG. 3 normally assumes a closed position. In order to displace the non-return valve means to the open position which is illustrated in FIG. 3a, there is shown diagrammatically a solenoid $f$ which when energized will displace the valve from the position of FIG. 3 to that of FIG. 3a, so that the solenoid displaces the valve away from its normally closed position. Thus, the solenoid $f$ forms a moving means for moving the non-return valve means from the position which it normally assumes, and this moving means, while illustrated as a solenoid, may take other forms such as suitable hydraulic, pneumatic, or even mechanical structure. The solenoid $f$ can be energized either automatically or manually in accordance with the particular conditions under which the structure of the invention is used.

The structure of FIG. 3 operates in the following manner:

Assuming that the non-return valve means $e$ is maintained in its open position shown in FIG. 3a by energization of the solenoid $f$, then the structure is the same as if the duct $d_1$ communicated without any interruption with the location B so that the compressible fluid in the cylinder $a$ could flow in either direction through the passage means when the piston is between the locations A and B depending upon the direction of movement of the piston. Thus, the resistance to movement of the piston under these conditions, as long as the piston is between the locations A and B is negligible irrespective of the direction in which the piston moves in the cylinder. Whatever fluid is displaced by the piston out of the cylinder can under these conditions flow with substantially no resistance back into the cylinder. Thus, as may be seen from FIG. 4, between the locations A and B the characteristic curve for the structure of the invention is a straight horizontal line extending along the abscissa and indicating that the force P required to displace the piston is zero under these conditions. If, however, the piston $c$ is displaced out of the space between the locations A and B beyond either one of these locations, then a pair of curved portions $C_1$ having opposite curvatures with respect to each other will be produced, as indicated in FIG. 4, and these curved portions $C_1$ correspond to the curve $c$ of FIG. 2.

Of course if the non-return valve $e$ is closed while the piston $c$ is located outside of the space between the locations A and B, then the closing of the valve will have no influence on the operation. However, if the electromagnet $f$ is de-energized while the piston $c$ is between the locations A and B such as at the location X shown in FIG. 3, then of course the valve $e$ will close and there will be a substantial difference in the operation of the pneumatic device. Assuming that the piston $c$ moves to the right, as viewed in FIG. 3, then from the moment when the valve $e$ closes there will be a substantial increase in the resistance of the movement of the piston $c$ to the right, as viewed in FIG. 3. Thus, it will be seen that when the valve $e$ is closed fluid can still flow through the outlet at the location A along the duct $d_1$ and through the valve and the duct $d_2$ back into the cylinder, but fluid cannot flow in the reverse direction so that when the piston $c$ moves toward the right, as viewed in FIG. 3, is located between the locations A and B, and the valve $e$ closes the piston will suddenly encounter a substantial increase in resistance to movement, and this is illustrated by the curve $C'_2$ in FIG. 5. On the other hand, if the piston $c$ is displaced to the left, as viewed in FIG. 3, after the valve $e$ closes, then the fluid can easily flow through the valve so that there is substantially no resistance and the piston $c$ can still move to the left without encountering any substantial resistance, and this is illustrated by the horizontal line AX in FIG. 5 located along the abscissa. However, as soon as the piston $c$ moves to the left beyond the location A, then of course the curve $C_2$ will result which of course corresponds to the curve $C_1$ of FIG. 4. If the piston $c$ is now again displaced toward the right, as viewed in FIG. 3, the characteristic curve will follow the curve $C_2$ in FIG. 5 up to the location A, but then as soon as the piston $c$ is displaced beyond the location A, since the valve $e$ is still closed the piston will again encounter a substantial resistance resulting in the operation disclosed by the curve $C''_2$.

Thus, it will be seen that the structure of the invention which is shown in FIG. 3 outside of the cylinder $a$ forms a resistance-increasing means which is capable of substantially increasing the resistance to the movement of the piston $c$ in at least one direction as long as the piston $c$ is within that portion of the cylinder located between the locations A and B where the ducts $d_1$ and $d_2$ respectively communicate with the interior of the cylinder $a$.

Figure 4:
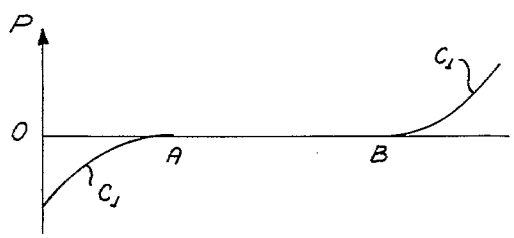
Figure 5:
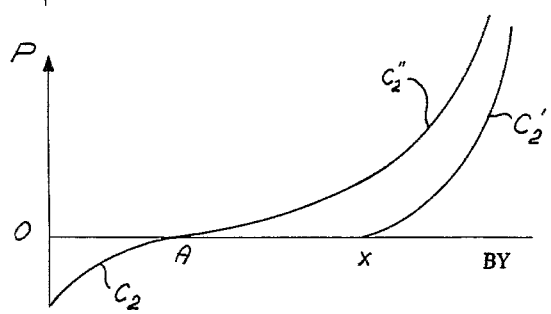
FIG. 5 shows the curve of operation of the device of FIG. 3 upon closing of the valve when the piston is in a given position such as that shown in FIG. 3.

A comparison of the characteristic curve $C_1$ of FIG. 4 with the characteristic curve $C_2$–$C''_2$ of FIG. 5 shows that it is possible to very easily modify with the structure of the invention the forces which must be applied to the piston rod to move the latter as a function of the displacement of the piston rod. In effect, the changeover from one to the other type of operation is obtained very simply by the closing and opening of the electrical circuit of the solenoid $f$ which when energized will maintain the valve open or when de-energized will release the valve so that it will assume its normally closed position.

Figure 6:
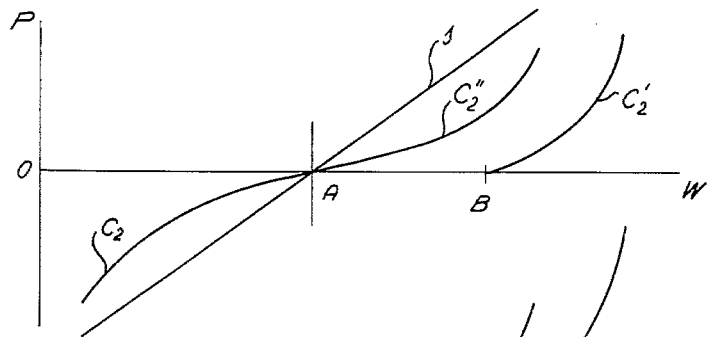
FIG. 6 illustrates the curve of operation of FIG. 5 together with the characteristic curve of a suspension spring of a vehicle.
Figure 7:
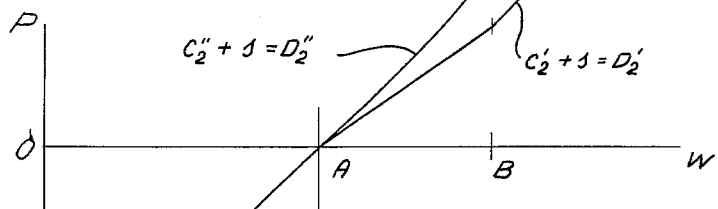
FIG. 7 is a graphical representation of the result achieved from the addition of the curves of FIG. 6.
Figure 8:
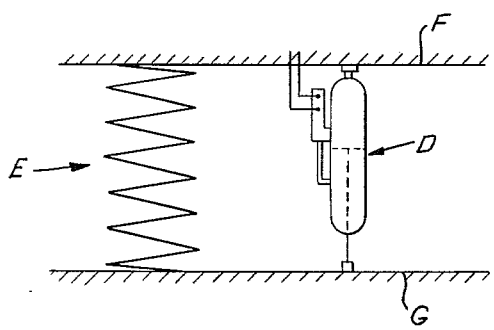
FIG. 8 is a diagrammatic illustration of the structure of the invention combined with a suspension spring, FIG. 8 thus illustrating the structure whose operation is diagrammatically shown in FIGS. 6 and 7.

The above-described structure of the invention has many practical applications. Thus, it may be used in vehicle suspensions in combination with springs such as air springs which have a constant volume of air or metal springs such as steel coil springs. Thus FIG. 8 diagrammatically illustrates the device D of the invention, as illustrated in FIG. 3 and described above, connected between a chassis F and a wheel axle G of a vehicle, and this device D is connected in parallel with a steel coil spring E. With such an arrangement it is possible to provide two distinctly different types of operation which can thus be used for two distinctly different types of loads, and also the resulting characteristic curves are not straight lines but are progessively curved to give a very smooth operation. Thus, referring to FIG. 6 it will be seen that the curve of FIG. 5, which is the curve of the device D is combined with a curve $s$ which is a straight line and which is characteristic of the spring E by itself. When the devices D and E are combined, then their curves of operation will be added to each other to provide the operation indicated in FIG. 7 where the curve $C_2$ plus the curve $s$ provides the curve $D_2$ while the curve $C''_2$ plus $s$ gives the curve $D'_2$ and the curve $C'_2$ plus $s$ gives the curve $D'_2$. Thus, it will be seen that by combining the device D with a conventional spring E in a vehicle suspension the characteristic curve follows a progressively curving path rather than a straight line and in addition two different types of characteristic curves are available, as is apparent from FIG. 7.

It should be noted that the spring E will be in actual practice designed in such a way that the piston of the pneumatic device of the invention occupies its position of equilibrium, at the location A (FIG. 7) when the vehicle rests without any load or is charged only up to 20% of the normal maximum load which it will carry during normal operation.

Furthermore, the outlet at the location A preferably is of such a size that it can never be completely closed by the piston $c$. In other words the thickness of the piston $c$ is smaller than the maximum dimension of the outlet at the location A in the direction of the axis of the cylinder. Thus, under these conditions equilibrium at the location A is assured.

Moreover, in order to increase the life and reliability of the operation of the pneumatic device of the invention the location B should be situated at one end of the cylinder $a$, and such a location is shown in the embodiment of FIG. 9 which differs in additional respects from that of FIG. 3.

Thus, referring to FIG. 9 it will be seen that the cylinder $a$ again slidably accommodates the piston $c$ which is connected to the piston rod $b$ which extends fluid-tightly and slidably through the bottom end of the cylinder $a$, as viewed in FIG. 9. In the embodiment of FIG. 9 the duct $d_1$ is replaced by a chamber $d'_1$ which surrounds the cylinder and communicates with the interior thereof through one or more openings at the location A, as indicated in FIG. 9. The duct $d_2$ is replaced by a chamber $d'_2$ located at one end of the cylinder and communicating through one or more openings at the location B which is at one end of the cylinder as shown in FIG. 9. The chambers $d'_1$ and $d'_2$ communicate with each other through an opening in a common wall situated between these chambers and through which the stem of the non-return valve $e'$ extends, as shown in FIG. 9. At the upper end of the structure of FIG. 9 is located a solenoid $f'$ which cooperates with the valve stem to act on the latter so that when the solenoid is energized the valve will be moved upwardly, as viewed in FIG. 9, closing the opening between the chambers $d'_1$ and $d'_2$. On the other hand, when the solenoid is unenergized the valve $e'$ can drop onto a suitable support member $t$. Thus, it will be seen that with this construction the valve assumes a normally open position where the fluid in the cylinder $a$ can flow in either direction through the passage means formed by the chambers $d'_1$ and $d'_2$, so that with this embodiment when the solenoid is unenergized an operation as indicated in FIG. 4 will be provided. On the other hand, when the solenoid $f'$ is energized it is still possible for fluid to flow out of the cylinder during downward displacement of the piston $c$, when the latter is located between the locations A and B, along the chamber $d'_1$ to force its way past the closed valve and through the opening at the location B back into the cylinder. In other words the force with which the solenoid maintains the valve closed is insufficient to prevent the air displaced through the outlets at the location A out of cylinder from moving back into the same, since this air without exerting very much pressure can easily displace the valve in opposition to the magnetic force which tends to keep it closed. On the other hand, when the piston $c$ is between the locations A and B and is displaced upwardly, as viewed in FIG. 9, and valve $e'$ is closed, then of course the fluid cannot be displaced past the valve and thus an operation as indicated in FIG. 5 will be produced. Thus it will be seen that with the embodiment of FIG. 9 a structure which differs considerably from that of FIG. 3 will still produce the results of the invention, and with this structure of FIG. 9 the valve and the location B are situated at one end of the cylinder and in addition the valve assumes a normally open position when the solenoid is unenergized and is closed only upon energizing of the solenoid, so that an arrangement which is the reverse of that of FIG. 3, with respect to operation of the valve, will still produce the results of the invention.

It will be apparent to those skilled in the art that the problem of providing a proper seal for the piston rod is not very great because the self-pumping effect compensates for any leakage. Nevertheless, the stuffing box or other sealing gland for the piston rod must be very carefully made and fitted, and it is of advantage to be able to eliminate such a sealing gland and to provide a liquid seal.

This latter result is possible, in accordance with the invention, by combining the structure of the invention with a hydraulic shock absorber, in such a way that the two devices include a common cylinder and piston rod, and such a construction is illustrated in FIG. 10. As may be seen from FIG. 10, the structure of FIG. 9 is included at the upper part of the structure of FIG. 10. The only difference is that the cylinder $a'$ of FIG. 10 is longer than the cylinder $a$ of FIG. 9 so that it can accommodate the liquid of the shock absorber, and in addition the piston rod $b'$ of FIG. 10 is longer than the piston rod $b$ of FIG. 9 so that a common piston rod $b'$ extends throughout the entire assembly of FIG. 10 and fluid-tightly through the bottom end of the cylinder $a'$. With this construction there is provided a valved wall $k$ between the pneumatic device of the invention and the shock absorber and part of the liquid of the shock absorber can flow into and out of a relatively small space at the lower part of the pneumatic device of the invention. The piston $c'$ of the shock absorber is also fixed to the piston rod $b'$ and operates in a conventional way. Because a part of the hydraulic liquid of the shock absorber is situated in the lower part of the pneumatic device of the invention, as illustrated in FIG. 10, the pneumatic device performs the function of a chamber for allowing expansion and contraction of the hydraulic liquid due to temperature variations, as is required with a conventional hydraulic shock absorber, and on the other hand a sealing gland for the pneumatic device is completely eliminated since the function of such a seal is taken over by the liquid in the lower portion of the pneumatic device of FIG. 10. Of course, a sealing gland such as shown at the bottom of FIG. 10 is necessary in any event in any shock absorber. Thus, with the combination of FIG. 10 it becomes possible to completely eliminate the necessity for a pneumatic seal as is required with the structure of FIG. 9, and at the same time it is possible to eliminate from the hydraulic shock absorber the compensating chamber which is required to compensate for volumetric fluctuations in the liquid due to temperature changes, since this latter function can be taken over by the pneumatic device, so that the combination of FIG. 10 greatly simplifies both the construction of the pneumatic device and the construction of the shock absorber.

It should be noted that with the structure of the invention it is best to provide the compressible fluid, such as air, with such a pressure in the interior of the cylinder that at all times this pressure will be greater than atmospheric pressure irrespective of the position of the piston in the cylinder.

The details of the shock absorber construction are not further illustrated or described since they are conventional.

It will be understood that each of the elements described above, or two or more together, may also find a useful application in other types of fluid-pressure devices differing from the types described above.

While the invention has been illustrated and described as embodied in fluid-pressure devices for vehicle suspensions or the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A fluid-pressure device adapted to be used in vehicle suspensions or the like, comprising, in combination, a cylinder containing a compressible fluid; a piston slidable along the interior of the cylinder; a piston rod fixed to said piston and extending therefrom fluid-tightly and slidably through one end of said cylinder; a pair of outlet means axially spaced with respect to each other along said cylinder and communicating with the interior thereof;

non-return valve means coacting with one of said outlet means and movable between an open position providing fluid flow through said one outlet means in either direction and a closed position limiting fluid flow through said one outlet means in only one direction, said non-return valve means normally assuming one of said positions; and moving means operatively connected to said non-return valve means for moving the latter to the other of said positions, whereby when said non-return valve means closes said one outlet means, said piston when situated between said pair of outlet means and advancing toward said one outlet means will encounter substantially increased resistance to movement of said piston toward said one outlet means from the moment when said valve means closes said one outlet means.

2. A fluid-pressure device adapted to be used in vehicle suspensions or the like, comprising, in combination, a cylinder containing a compressible fluid; a piston slidable along the interior of said cylinder; a piston rod fixed to said piston and extending therefrom fluid-tightly and slidably through one end of said cylinder; passage means located at the exterior of said cylinder and communicating with the interior thereof at a pair of locations which are axially spaced with respect to each other along said cylinder; non-return valve means coacting with said passage means and movable between an open position providing for fluid flow in either direction through said passage means and a closed position limiting fluid flow to only one direction through said passage means, said non-return valve means normally assuming one of said positions; and moving means operatively connected to said non-return valve means for moving the latter to the other of said positions, whereby when said non-return valve means closes said passage means to limit the flow of fluid therethrough to only one direction, said piston when situated between said locations and moving in a direction which displaces fluid through said passage means in the other direction will encounter a substantially increased resistance upon closing of said valve means.

3. A fluid-pressure device as recited in claim 2 and wherein a spring means urges said valve means to said closed position thereof so that said closed position is the position normally assumed by said valve means, and wherein a solenoid is operatively connected to said valve means and forms said moving means for moving said valve means in opposition to said spring means to said open position thereof.

4. A fluid-pressure device as recited in claim 2 and wherein said non-return valve means includes a valve member which by gravity assumes the open position of said valve means so that said valve means normally assumes said open position thereof, and wherein a solenoid forms said moving means and is operatively connected to said valve means to move the latter to said closed position thereof when said solenoid is energized.

5. A fluid-pressure device adapted to be used in vehicle suspensions or the like, comprising, in combination, a cylinder containing a compressible fluid; a piston slidable along the interior of the cylinder; a piston rod fixed to said piston and extending therefrom fluid-tightly and slidably through one end of said cylinder; passage means located at the exterior of said cylinder and communicating with the interior thereof at a pair of locations which are axially spaced with respect to each other along said cylinder, one of said locations being situated at the other end of said cylinder; and non-return valve means coacting with said passage means and also situated at said other end of said cylinder, said non-return valve means being movable between an open position where fluid can flow into and out of said cylinder through said passage means in one direction or the other depending upon the direction of movement of said piston when the latter is situated between said locations and said non-return valve means when moving to a closed position limiting the direction of fluid flow through said passage means to only one direction so that when said piston is situated between said locations and advances in said cylinder in a direction tending to displace fluid out of the latter through said passage means in the other direction said piston will encounter a substantial resistance to movement upon closing of said valve means.

6. A fluid-pressure device as recited in claim 5 and wherein a second piston is connected to said piston rod between said first mentioned piston and said one end of said cylinder, and including means providing restricted communication between opposite sides of said second piston, said cylinder containing a hydraulic fluid in the interior thereof between said one end thereof and said passage means and said second piston moving in said hydraulic fluid and forming part of a shock-absorber assembly which is coaxial with the fluid-pressure device formed by said first-mentioned piston, said passage means, and said non-return valve means.

7. In a vehicle suspension, in combination, a pneumatic device including a cylinder containing a compressible fluid, a piston slidable along the interior of the cylinder, a piston rod fixed to said piston and extending therefrom fluid-tightly and slidably through one end of said cylinder, and resistance-increasing means communicating with the interior of said cylinder for substantially increasing the resistance to axial movement of said piston in at least one direction in said cylinder at any location along a given portion of said cylinder and including passage means communicating with axially spaced portions of said cylinder, and non-return valve means cooperating with said passage means for preventing flow of fluid in said one direction through said passage means; and a hydraulic shock absorber connected in the suspension together with said pneumatic device, said shock absorber having a cylinder portion which forms an extension of the cylinder of the pneumatic device, a piston rod forming an extension of said piston rod of the pneumatic device, and a second piston which is connected to said piston rod.

8. In a vehicle suspension, in combination, a cylinder containing a compressible fluid; a piston slidable along the interior of the cylinder; a piston rod fixed to said piston and extending therefrom fluid-tightly and slidably through one end of said cylinder; a pair of outlet means axially spaced with respect to each other along said cylinder and communicating with the interior thereof; non-return valve means coacting with said outlet means and movable between an open position providing free flow through said one outlet means in either direction and a closed position limiting fluid flow through said one outlet means in only one direction, said non-return valve means normally assuming one of said positions; moving means operatively connected to said non-return valve means for moving the latter to the other of said positions, whereby when said non-return valve means closes said one outlet means, said piston when situated between said pair of outlet means and advancing toward said one outlet means will encounter substantially increased resistance to movement of said piston toward said one outlet means from the moment when said valve means closes said one outlet means; and spring means located at the exterior of said cylinder and mounted in the suspension in parallel with said cylinder.

References Cited by the Examiner
UNITED STATES PATENTS

| | | | |
|---|---|---|---|
| 1,244,752 | 10/17 | McCrosson | 267—31 |
| 1,426,058 | 8/22 | Fritz | 267—65 |
| 1,442,646 | 1/23 | Butler | 188—88.1 |
| 1,886,712 | 11/32 | Messier | 267—64 |
| 1,980,423 | 11/34 | Messier | 267—64 |
| 3,100,635 | 8/63 | Bougeard | 267—65 |
| 3,112,909 | 12/63 | Suozzo et al. | 267—1 X |

ARTHUR L. LA POINT, *Primary Examiner.*